(12) United States Patent
Choksi et al.

(10) Patent No.: US 7,030,575 B2
(45) Date of Patent: Apr. 18, 2006

(54) DEFLECTION SUPPLY VOLTAGE FEEDBACK CONTROL IN CONJUNCTION WITH FREQUENCY CHANGE

(75) Inventors: Snehali Choksi, Fort Wayne, IN (US); Robert Joseph Gries, Indianapolis, IN (US); Kevin Michael Williams, Indianapolis, IN (US); David Ross Jackson, Indianapolis, IN (US); Robert Goah Watson, III, Noblesville, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 0 days.

(21) Appl. No.: 10/511,835

(22) PCT Filed: Apr. 16, 2003

(86) PCT No.: PCT/US03/11564

§ 371 (c)(1),
(2), (4) Date: Oct. 19, 2004

(87) PCT Pub. No.: WO03/090333

PCT Pub. Date: Oct. 30, 2003

(65) Prior Publication Data

US 2005/0212976 A1    Sep. 29, 2005

Related U.S. Application Data

(60) Provisional application No. 60/374,281, filed on Apr. 19, 2002.

(51) Int. Cl.
*G09G 1/04* (2006.01)
*H01J 29/70* (2006.01)

(52) U.S. Cl. .................. 315/389; 315/395; 315/411; 348/730

(58) Field of Classification Search ............... 315/364, 315/369, 387, 389, 395, 408, 411; 348/730, 348/735, 739
See application file for complete search history.

(56) References Cited

U.S. PATENT DOCUMENTS

| | | | |
|---|---|---|---|
| 4,048,544 A * | 9/1977 | Haferl | 315/408 |
| 4,516,169 A | 5/1985 | Truskalo | 348/730 |
| 4,588,929 A | 5/1986 | Wedam et al. | 315/395 |
| 4,633,146 A | 12/1986 | Babcock | 315/395 |

(Continued)

OTHER PUBLICATIONS

Copy of Search Report Dated Sep. 28, 2003.

*Primary Examiner*—Thuy Vinh Tran
(74) *Attorney, Agent, or Firm*—Joseph S. Tripoli; Harvey D. Fried; Christine Johnson

(57) ABSTRACT

A video display includes a scanner operable at a first frequency and a higher second frequency. A switch mode power supply drives a transformer with three secondaries. First and second rectifiers & filters are associated with the first and second secondaries. A rectifier is coupled to the third secondary and by way of a switch to the first filter. Feedback from the first filter controls the SMPS. In a first operating mode, the scanner is operated at the first frequency, the switch is open, the scanner supply is a first voltage from the first filter, and ancillary equipment is supplied with a third voltage by the second filter. In a second operating mode, the scanner is operated at the second frequency, the switch is closed, the scanner supply is a second voltage, higher than the first, from the first filter, and ancillary equipment is supplied with the same third voltage.

20 Claims, 2 Drawing Sheets

U.S. PATENT DOCUMENTS

| | | | |
|---|---|---|---|
| 4,658,342 A | 4/1987 | Wharton | 363/21.04 |
| 4,673,984 A | 6/1987 | Kikuchi et al. | 348/730 |
| 4,692,852 A | 9/1987 | Hoover | 363/21.16 |
| 4,761,587 A * | 8/1988 | Wharton | 315/408 |
| 4,829,414 A * | 5/1989 | Yook | 363/20 |
| 4,831,311 A | 5/1989 | Yug | 315/411 |
| 5,089,947 A | 2/1992 | Driscoll et al. | 363/20 |
| 5,978,040 A | 11/1999 | Diamant | 348/556 |
| 6,114,817 A * | 9/2000 | Fernsler | 315/411 |
| 6,157,549 A | 12/2000 | Nath | 348/730 |
| 6,396,542 B1 | 5/2002 | Patel | 348/445 |
| 6,552,504 B1 * | 4/2003 | Weber | 315/408 |

* cited by examiner

DEFLECTION SUPPLY VOLTAGE FEEDBACK CONTROL IN CONJUNCTION WITH FREQUENCY CHANGE

CROSS REFERENCE TO RELATED APPLICATIONS

This application claims the benefit, under 35 U.S.C. § 365 of International Application PCT/US03/11564, filed Apr. 16, 2003, which was published in accordance with PCT Article 21(2) on Oct. 30, 2003 in English and which claims the benefit of U.S. Provisional Patent Application No. 60/374,281, filed Apr. 19, 2002.

This invention relates to video displays, and more particularly to power supply arrangements for displays which may operate at different frequencies.

BACKGROUND OF THE INVENTION

Multifrequency video displays or monitors are used for both High Definition Television (HDTV) and National Television Standards Committee (NTSC) television viewing and for computer applications. At the current state of the art, charge-coupled device (CCD) displays tend to be costly, or unavailable, especially in large sizes, and in general are not as bright as kinescope or picture-tube types of displays. Plasma displays are not common. Thus, the kinescope display is in common use.

Kinescope displays are ordinarily scanned by means of inductive or electromagnetic yokes near the neck of the kinescope, to which both vertical and horizontal scan currents are applied, to create magnetic fields which deviate one or more electron beams traversing the tube to the phosphorescent display screen. National Television Standards Committee (NTSC) standards for conventional television specify a horizontal scanning frequency of about 15,734 Hz, and a vertical scan frequency of 60 Hz. A large body of art has grown up around vertical and horizontal deflection circuits. Because of the relatively high horizontal scan frequency and significant power involved in performing horizontal scan, the horizontal deflection scanning circuits commonly operate in a resonant retrace mode, in which currents and the associated power are recirculated back to the power source for re-use during the next following scan cycle.

The amplitude of current circulating in a resonant horizontal deflection circuit is mainly determined by the value of the B+ voltage. It is also determined, at least in part, by the desired scan frequency. For a given horizontal deflection system with a fixed value of kinescope ultor (High) voltage, a fixed amount of overscan, and a horizontal deflection yoke having a fixed inductance, the product of the scan time multiplied by the deflection circuit B+ tends to be a constant. Thus, the value of energizing voltage or B+ applied to the horizontal deflection circuit multiplied by the scan time is desirably constant. In the past, many video display systems were designed to apply a constant B+ to the horizontal deflection system.

With the advent of HDTV, many different video formats are available to the consumer. Some of these formats have vertical and horizontal deflection frequencies which differ from those of conventional NTSC broadcast television signals. The higher definition associated with HDTV implies a higher horizontal deflection frequency than for standard-definition television. As the horizontal frequency increases, the scan time must decrease, unless the frequency difference is very small and can be taken up in the retrace time. For most television systems in which the horizontal scanning frequency is varied, the retrace time is held constant, and the scan time is varied. Thus, as the horizontal scanning frequency is increased, the scan time is decreased, and the scan B+ is also increased so that the product of the scan time multiplied by the B+ is a constant.

Many present-day television display devices, including television receivers, derive their scan B+ voltage from a switch mode power supply (SMPS) including inductive elements and a transformer having a secondary winding. The scan B+ is generated from the scan secondary winding by rectification of SMPS pulsatory signals and subsequent filtration. In many such display devices, in order to avoid the need for plural power supplies, the SMPS must also supply auxiliary or ancillary voltages, for operation of systems or circuits other than the horizontal deflection system. In a television receiver, for example, the ancillary systems may include RF and IF processors, video and sound processors, convergence, and others. These ancillary systems ordinarily require that their energizing voltages remain constant, regardless of the horizontal deflection frequency which happens to be in use. The ancillary energizing voltages may be derived from secondary windings of the SMPS transformer other than the one from which the horizontal scan or deflection B+ is derived. However, simply deriving the ancillary energizing voltages from a separate secondary winding will not guarantee that the ancillary energizing voltage does not change. Since the number of turns per winding in the SMPS transformer is fixed, changing the horizontal scan B+, without more, also changes the ancillary energizing voltage.

Improved video display arrangements are desired.

SUMMARY OF THE INVENTION

A video display apparatus according to an aspect of the invention comprises a deflection circuit output stage for selectively generating a deflection current in a deflection winding at a first deflection frequency and at a second deflection frequency, and a power supply for producing, via a common power transistor of an output stage, a first supply voltage at a first terminal and a second supply voltage at a second terminal. A first switch is responsive to a control signal indicative of the selected deflection frequency, for selectively coupling the first supply voltage to the deflection circuit output stage when the first deflection frequency is selected, and the second supply voltage, when the second deflection frequency is selected. A power supply regulator is responsive to at least one of the first and second supply voltages for regulating the at least one of the first and second supply voltages via a negative feedback path.

In a particular version of the video display according to this aspect of the invention, a second switch is responsive to a control signal that is indicative of the selected frequency and coupled in the negative feedback path. The second switch has a first state when the deflection current is at the first deflection frequency, and has a second state when the deflection current is at the second deflection frequency, for providing coarse adjustment. In another avatar of this version of the video display, a source of a fine adjustment signal is coupled to the negative feedback path for providing fine adjustment. In a hypostasis of this avatar, a portion of the negative feedback path contains information derived from at least one of the first and second supply voltages, information derived from the state of the second switch and information derived from the fine adjustment signal.

In another particular version of the video display according to this aspect of the invention, each of the first and second supply voltages is regulated via the negative feedback path.

In yet another particular version of the video display according to this aspect of the invention, an output transformer is coupled to the power transistor for producing the first supply voltage from a voltage developed in a first transformer winding and the second supply voltage from a voltage developed in a second transformer winding of the transformer, and the transformer has a third transformer winding for producing a third supply voltage that is coupled to a load circuit, wherein a volts-per-turn ratio in the third transformer winding remains the same at each of the first and second deflection frequencies.

In yet a further particular version, an output transformer is coupled to the power transistor for producing the first and second supply voltages, and the transformer has a transformer winding for producing a third supply voltage that is coupled to a load circuit, wherein a volts-per-turn ratio in the transformer winding remains the same at each of the first and second deflection frequencies.

In another particular version, the power supply regulator is responsive to a feedback signal produced at an output terminal of the first switch for regulating each of the first and second supply voltages.

DESCRIPTION OF THE INVENTION

Figure 1:
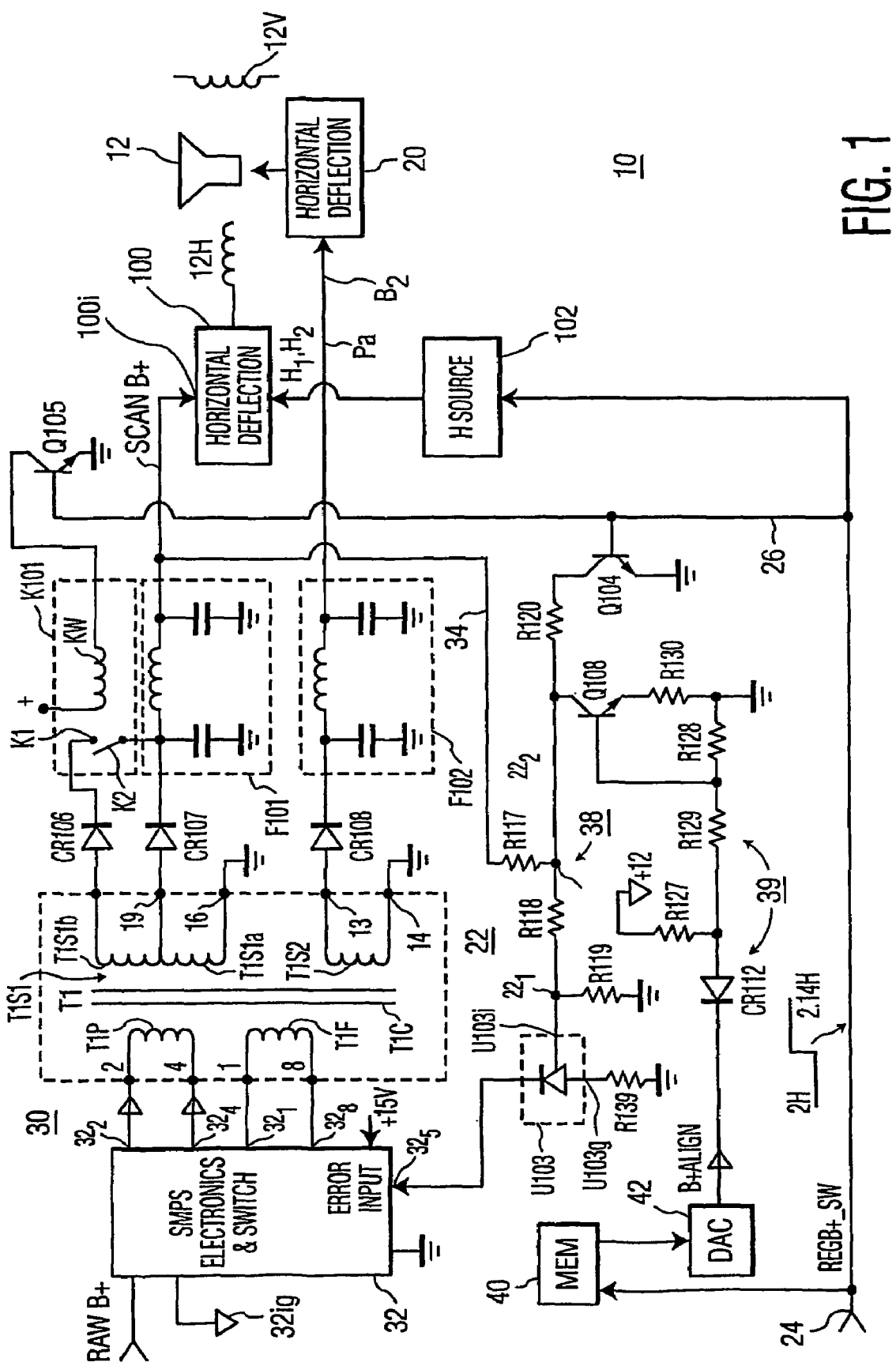
FIG. 1 is a simplified schematic diagram of a portion of a television receiver according to an aspect of the invention.

In FIG. 1, a system designated generally as 10 includes a kinescope 12 associated with a vertical deflection coil 12V and a horizontal deflection coil 12H. A block 20 represents ancillary equipment, which may include, for example, any or all of kinescope cathode drivers, radio-frequency receivers and intermediate-frequency amplifiers, demodulators, audio circuits, video processors, and the like, all well known for use in television and video display apparatus. A horizontal deflection or scan circuit, illustrated as a block 100, is connected to horizontal deflection coil 12H for applying horizontal scan signals thereto, for causing the desired horizontal deflection, at a selected horizontal scan frequency $H_1$ or $H_2$ controlled by a source illustrated as a block 102. Horizontal deflection circuit 100 receives an energizing voltage designated as B+ at an energizing voltage input port 100$i$.

In FIG. 1, a switch-mode power supply (SMPS) designated generally as 30 includes a power transformer T1 including a primary winding T1P connected to power transformer T1 terminals 2 and 4, a magnetic core designated TIC, a first secondary winding T1S1 including a first portion T1S1$a$ connected to transformer terminals 16 and 18, and a second portion T1S1$b$ connected to transformer terminals 16 and 19, and a regeneration or oscillation inducing feedback winding T1$f$ connected to transformer terminals 1 and 8. One end of secondary winding portion T1S1$a$ is connected to ground by way of terminal 18. Since both secondary winding portions T1S1$a$ and T1S1$b$ are connected to transformer terminal 16 and the remote end of portion T1S1$a$ is connected to ground, terminal 16 may be considered to be a tap on secondary winding T1S1. Viewed another way, the end of secondary winding portion T1S1$b$ remote from terminal 16 is connected to a terminal 19, so that the two serially-connected portions of secondary winding T1S1 form a tapped secondary winding with a tap terminal 16.

Secondary winding T1S2 of FIG. 1 has one end coupled to ground by way of a terminal 14, and the other end connected to a terminal 13. Secondary winding T1S2 represents any one of a plurality of such windings which may be associated with transformer T1, each producing a different or independent output voltage or power for energizing various portions of the apparatus 10.

Also in FIG. 1, a block 32 represents the electronics and power switching portion of switch mode power supply 30. Primary winding T1P terminals 2 and 4 of transformer T1 are connected to SMPS electronics and Power switching block terminals $32_2$ and $32_4$, respectively, and feedback secondary winding T1$f$ terminals 1 and 8 are connected to SMPS electronics and power switching block terminals $32_1$ and $32_8$, respectively. SMPS electronics and power switching portion 32 receives raw B+ as its source of energizing power at a terminal designated RAW B+ relative to an isolated ground, illustrated by a downward-pointing open triangle symbol 32$ig$. SMPS electronics and power switching portion 32 switches the power B+ applied to primary winding T1P of transformer T1 so as to periodically store energy in the inductance associated with the winding, and to allow the energy so stored to produce pulsating or pulsatory (alternating) voltages on secondary windings T1S1, T1S2, and T1$f$. The pulsatory voltage generated on secondary winding T1$f$ is coupled back to the electronics and power switching portion 32 of switch mode power supply 30 by way of a terminals $32_1$ and $32_8$ to aid in sustaining oscillation. The pulsatory voltages appearing on secondary windings T1S1 and T1S2 are rectified, as known in the art, to produce pulsatory currents which are smoothed by filtering to produce the desired direct energizing voltages. More particularly, the pulsatory voltage produced at transformer terminal 16 by secondary winding portion T1S1$a$ is rectified by a unidirectional current conducting device illustrated as a diode or rectifier CR107 to produce a voltage at terminal 02, and applied to a filter designated as F101 to be smoothed to produce a first "Scan B+" voltage for application to horizontal deflection circuit 100. Similarly, the pulsatory voltage produced at transformer terminal 13 by secondary winding T1S2 is rectified by a unidirectional current conducting device illustrated as a diode or rectifier CR108, and applied to a filter designated as F102 to be smoothed to produce a direct voltage B2 for application over a path Pa to the ancillary equipment illustrated as block 20.

In FIG. 1, the pulsatory voltage produced at terminal 19 of transformer T1 is greater than the pulsatory voltage produced at tap terminal 16, because of the additional voltage added by winding T1S1$b$ to that voltage appearing at terminal 16. The voltage at terminal 19 is applied to a unidirectional current conducting device illustrated as a diode or rectifier CR106. The pulsatory voltage available at the cathode of device CR106 is applied to a terminal K1 of a relay K101. Relay K101 also has a winding KW which, when energized, causes movable contact element K2 to connect to contact K1, but in the illustrated unenergized state of relay K101, such contact is not made, and no current flows in unidirectional current conducting device CR106.

In the arrangement of FIG. 1, the scan B+ voltage at the output of smoothing filter F101 is applied by way of a path 34 to a power supply controller designated generally as 38, which includes a voltage divider 22 and an error amplifier U103. Voltage divider 22 includes three resistors, namely resistors R117, R118, and R119, having tap points $22_1$ and $22_2$ between them. The scan B+ voltage is divided in a (reduced by a) fixed ratio by voltage divider 22 and applied from tap $22_1$ to a reference input terminal or port U103*i* of an error amplifier illustrated as U103, which in this particular embodiment is a type TL431 integrated circuit, manufactured by Texas Instruments, NEC, Samsung, and others. Error amplifier U103 has its terminal U103*g* connected to ground by way of a resistor R139. Error amplifier U103 compares the divided feedback voltage with an internal reference voltage and produces a feedback error signal which is coupled to an error signal input terminal $32_5$ of SMPS electronics and switch circuit 32, for control of the switching power supply 30 in known degenerative fashion.

As so far described, the switch mode power supply 30 senses the Scan B+ voltage applied to horizontal deflection circuit 100, and uses feedback to control that sensed voltage. So long as the feedback control of the Scan B+ voltage continues, the horizontal deflection circuit 100 and the ancillary equipments 20 are correctly energized. According to an aspect of the invention, the H drive source 102 is capable of driving the horizontal deflection circuit 100 at different or disparate horizontal frequencies, designated H1 and H2. In one embodiment of the invention, H1 is about twice the NTSC horizontal frequency of 15,734 Hz., corresponding to about 31,468 Hz., and H2 is about 2.14 times the NTSC horizontal frequency, corresponding to about 33,750 Hz. The Scan B+ voltage applied to power input terminal 100*i* of horizontal deflection block 100 is required to change when the operating deflection frequency is changed, to maintain the constant product of Scan B+ multiplied by the reduced scan time engendered by the higher operating frequency. In particular, the Scan B+ voltage applied to input port 100*i* of horizontal deflection circuit 100 must theoretically increase by a factor of 2.14/2, or 1.07, in order to maintain constant product for an operating frequency change of 2.14/2, but which may deviate due to different amounts of overscan.

In FIG. 1, regulator B+ switching signal REGB+_SW is applied by way of a port 24 and a signal path 26 to H source 102 for selecting either the 2H or 2.24H horizontal operating frequency. Switching signal REGB+_SW has a logic low level when the horizontal frequency is to be 2H and a high level when the horizontal frequency is to be 2.14H. In order to raise the Scan B+ voltage, it would be a simple matter to adjust the feedback voltage divider 22 to a different division ratio, to thereby increase the power stored by the switch mode power supply in the primary winding T1P of transformer T1 during each operating cycle, thereby increasing the pulsatory voltage produced by secondary winding T1S1*a* and the rectified pulsatory voltage produced by diode CR107. This would have the effect, however, of increasing the volts-per-turn of all the secondary windings of transformer T1, with the result that the voltage produced by representative secondary winding T1S2, diode CR108, and filter F102 for application to the ancillary equipment illustrated as block 20, which in turn would undesirably result in a proportional increase in the ancillary energizing voltage.

Instead, according to an aspect of the invention, the Scan B+ voltage applied to the horizontal deflection circuit 100 is changed by switching another secondary winding, by means of relay K101, into circuit with smoothing filter F101. The feedback ratio is also changed to provide the same feedback voltage to the error amplifier so the volts-per-turn does not change as a function of the change in Scan B+. The change of the Scan B+ is accomplished by additionally applying switching signal REGB+_SW to the base of a grounded-emitter transistor Q105, to turn ON transistor Q105 when the REGB+_SW voltage has a high level for selecting the higher 2.14H scan frequency. When the higher scan frequency is selected, the scan time decreases, and the Scan B+ voltage must increase. The increase in scan voltage is accomplished by relay K101, in which a magnetic winding KW is energized by transistor Q105 in its ON state. When relay K101 magnetic winding KW is energized, movable element K2 is brought into conductive contact with stationary element K1, so that the rectified pulsatory voltage at the cathode of diode CR106 is applied to smoothing filter F101. The pulsatory voltage from CR106, being greater than the pulsatory voltage from diode CR107, keeps diode CR107 turned OFF (causes CR107 to cease conduction). In effect, relay K101 disconnects CR107 and its associated winding T1S1*a* from filter F101, and connects CR106 and its associated pair of windings T1S1*a*, T1S1*b* to the filter. Since the rectified pulsatory voltage produced by CR106 is greater than that produced by CR107, the smoothed B+ is also greater when relay K101 is energized for 2.14H operation.

SMPS electronics and power switch 32 of FIG. 1 responds to degenerative error signals applied to its error signal input port $32_5$ from error amplifier U103. SMPS electronics and power switch 32 adjusts its switch timing and/or frequency in such a manner as to tend to control the amount of energy stored in transformer primary winding T1 during each switch cycle in response to the error signal. If the error signal changes as a result of the change in the magnitude of the Scan B+ engendered by the switching of relay K101, the ancillary supply voltages produced by representative secondary winding T1S2, diode CR108, and filter F102 will change, and more particularly the voltage produced by secondary winding T1S2, diode CR108, and filter F102 will decrease when relay K101 is energized if the feedback ratio is not adjusted.

According to an aspect of the invention, the feedback voltage division is changed, preferably in proportion to the change in the nominal Scan B+ which results from the switching of Relay K101. More particularly, in FIG. 1, the REGB+_SW signal applied by way of terminal 24 and path 26 to H source 102 and to transistor Q105 is also applied to the base of a further grounded-emitter transistor Q104. Transistor Q104 thus becomes conductive or ON when signal REGB+_SW is logic high. When Q104 is conductive, a resistor R120 is introduced into voltage divider 22, to increase the division ratio. Put another way, the divided feedback signal at tap $22_1$ is reduced when the Scan B+ voltage is increased, so that the feedback voltage applied to error amplifier U103 remains the same, at least in principle. Thus, regardless of whether the Scan B+ voltage is derived from CR107 and is relatively low, or is derived from CR106 and is relatively high, the feedback sample at the input port of error amplifier U103 remains the same. Since the feedback signal remains the same as a result of the switching of the coupling ratio of the feedback path, SMPS electronics and switch block 32 continues to transfer the same amount of energy per cycle to the secondary windings, including secondary winding T1S2. When secondary winding T1S2 receives the same energy per cycle, the ancillary power supply including CR108 and filter F102 produces the same output voltage for operating the ancillary equipment 20.

In FIG. 1, an additional circuit 39 allows remote control of the magnitude of the Scan B+ voltage. The additional circuit 39 includes a memory (MEM) illustrated as a block 40, together with a digital-to-analog converter (DAC), for producing a signal B+ALIGN. Signal B+ALIGN is applied to the base of a transistor Q108 by way of a temperature compensating diode CR112 and a voltage divider including resistors R127, R128, and R129. Transistor Q108 has its emitter coupled by a resistor R130, so it produces a collector current which is linearly responsive to the magnitude of B+ALIGN, and produces an additional offset of the feedback signal at tap point $22_1$ of voltage divider 22, which can be used to perform fine adjustment of the Scan B+ voltage. The memory 40 is active during all the horizontal frequency modes, but accesses different memory locations under the control of REGB+_SW. The memory locations are preprogrammed with values which compensate for tolerances. An advantage of this arrangement is that the coarse adjustment of the feedback ratio is provided by resistor R120, and the combination of memory 40 and DAC 42 can be used over its full dynamic range for trimming the Scan B+voltage.

Figure 2:
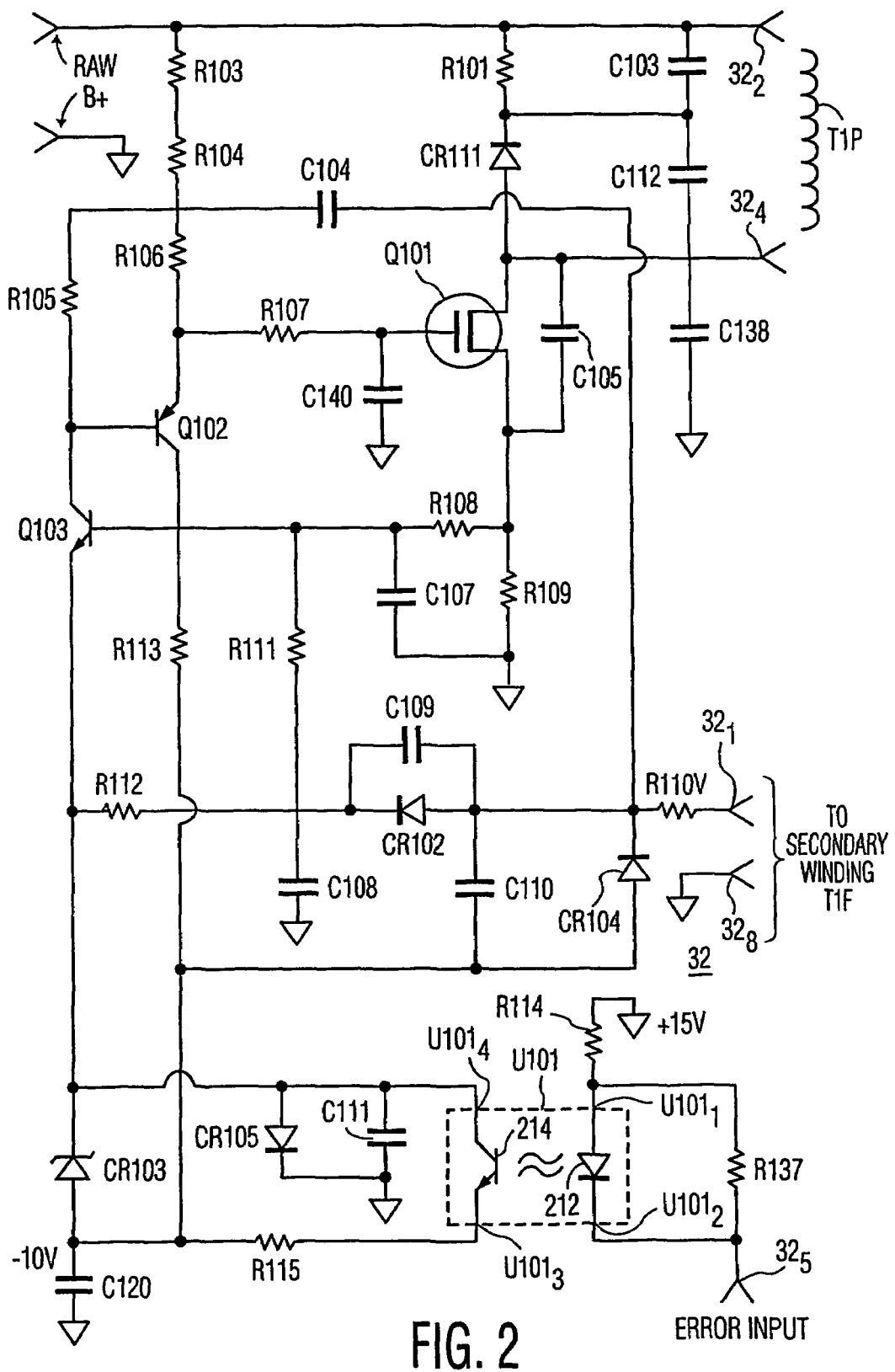
FIG. 2 is a more detailed, but still simplified, diagram of a portion of the arrangement of FIG. 1.

The error signal produced by U103 by comparing the feedback Scan B+ signal from tap $22_1$ of voltage divider 22 of FIG. 1 is applied by way of error signal input port $32_5$ of FIG. 2 to input terminal $U101_2$ of a photocoupler or optoisolator U101. Optoisolator U101 provides isolation between those portions of the display unit 10 of FIG. 1 which are at line potential and isolated from ground and the user-accessible or grounded portions of the SMPS electronics and switch block 32. A resistor R137 is coupled from terminal $U101_1$ of U101 to terminal $U101_2$, and terminal $U101_1$ is connected by a resistor R114 to a +15 v source.

In FIG. 2, the primary winding T1P is illustrated in phantom across terminals $32_2$ and $32_4$ to aid understanding. Power FET switch Q101 alternately switches terminal $32_4$ of primary winding T1P to isolated ground by way of a current sensing resistor R109. Since terminal $32_2$ of primary winding T1P is connected to Raw B+, the switching of Q101 switches primary winding T1P across Raw B+. During those intervals in which Q101 is conductive, current through T1P and through R109 increases, with a concomitant increase in the energy stored in the inductance of the primary winding. Also during those intervals in which Q101 is conductive and current is increasing in primary winding T1P, a positive-going (+) feedback voltage is generated at terminal $32_1$ of feedback secondary winding T1f relative to isolated ground. This positive-going voltage is fed by way of a resistor R110, a path 210, capacitor C104, and resistors R106 and R107 to the gate of power switch Q101, to tend to hold Q101 in a conductive state. A capacitor C140, connected to the gate of Q101, co-acts with resistors R106 and R107 to limit the rise time of the applied gate voltage, to thereby tend to reduce radio-frequency interference.

The voltage at terminal $32_1$ of FIG. 2 relative to isolated ground alternates during the cyclical operation of the SMPS of FIG. 2. This alternating voltage is used to drive to separate power supplies, one of which is associated with CR104, and the other of which is associated with CR102. The first power supply has a charge path which includes R110, CR104, C120, and terminal $32_8$ of secondary winding T1f, and it charges the non-grounded end of capacitor C120 to a negative voltage, which in a particular embodiment is about −9 or −10 volts.

The second power supply of FIG. 2 includes CR102 and capacitor C108, and it produces a positive voltage which tends to be proportional to the magnitude of the raw B+, because increasing B+ increases the voltage across the primary winding T1P, which in turn increases the voltage across secondary winding T1f. The negative voltage produced by the first power supply across capacitor C120 tends to be generated during the time that the regulated voltages are generated, and therefore tends to be constant.

The emitter of Q103 of FIG. 2 cannot rise to a voltage above isolated ground greater than +0.7 volts, because of the presence of diode CR105. Whenever the optically-controlled transistor 214 connected between terminals $U101_4$ and $U101_3$ of U101 conducts, the emitter of Q103 is taken to a negative voltage relative to isolated ground. CR103 provides transient protection. Capacitor C111 is a filter for the control voltage, and is associated with the loop time constant.

Transistors Q102 and Q103 are "SCR-connected" in a regenerative fashion in FIG. 2, so that if Q103 is turned ON, Q102 is also turned ON, and tends to remain ON. The SCR-connected pair is coupled between the gate of power switch Q101 and, when transistor 214 of optoisolator U101 is conductive, the negative voltage at the nongrounded terminal of capacitor C111. Thus, when the SCR-connected pair Q102, Q103 is conductive, power switch Q101 becomes less conductive, which in turn tends to produce a more negative voltage at its gate, so Q101 turns OFF in a regenerative fashion. The SCR-connected pair Q102, 103 is controlled by the "sawtooth" voltage appearing across current sensing resistor R109, in the source circuit of power switch Q101. More particularly, as the current increases in primary winding T1P as a result of conduction of Q101, the increasingly positive voltage on R109 is coupled by way of a filter, including a capacitor C107 and a resistor R108, to the base of Q103. When the base voltage is high enough, Q103 will turn ON, thereby turning ON Q102, and the conduction of the pair discharges the gate of Q101, and turns Q101 OFF. With Q101 OFF, energy stored in the inductance associated with transformer T1 is coupled as voltage to the various secondary windings T1f, T1S1, and T1S2, and is available for use.

The voltage on feedback secondary winding T1f reverses when Q101 turns OFF, becoming negative on terminal $32_1$. The negative voltage is coupled to the gate of Q101 by way of resistor R110, path 210, capacitor C104, and resistors R106 and R107, to tend to hold Q101 in the OFF state, and also turns OFF SCR-connected pair Q102, 103. Looking at it another way, the current in the SCR-connected pair must be taken low enough to reduce the sum of the alphas of the transistors below unity. Resistors R103 and 104 are start-up resistors. Once started, the circuit is regenerative. When the energy stored in the primary winding is exhausted into the secondary power supplies, the voltage on the primary winding decreases, which tends to make $32_1$ more positive. This positive-going voltage is communicated to the gate of Q101 to again turn ON Q101.

The magnitude of the positive voltage on C108 tends to become more positive as the Raw B+ increases, and this more positive value is communicated by way of a resistor R111 to the base of Q103, thereby tending to turn ON the SCR-connected pair earlier in the cycle, to compensate for the effects of a larger Raw B+. Resistor R112 decreases response time to a high load.

Feedback control of the Scan B+ of FIG. 1 is accomplished by coupling the error signal from error amplifier U103 to error input port $32_5$ of FIG. 2. An increasing value of Scan B+ causes an increasing error current from error amplifier u103. An increasing error current from U103 through the photodiode 212 of optoisolator U101 causes more photons to be emitted, which is equivalent to increasing base current in transistor 214. The increasing effective base current, in turn, causes transistor 214 to conduct more heavily, thereby tending to render the emitter of Q103 of the SCR-connected pair Q102, 103 more negative. With the emitter of Q103 more negative, it and the SCR-connected pair, will become conductive at a lower value of sawtooth voltage from current sensing resistor R109. The turn-ON of the SCR-connected pair is related to the turn-OFF of Q101. Thus, a tendency for an increase in the Scan B+ results in a tendency to turn power switch Q101 OFF at a lower value of current, which results in storage of less energy in the inductance associated with transformer T1 for that operating cycle. The storage of less energy for the cycle tends to reduce the Scan B+, and the degenerative feedback control is accomplished. In FIG. 2, R113 is a slow-start resistor which slows down the initial turn-on, and provides some fold-back. Resistor R115 provides a current limit for the transistor 214 in U101.

Other embodiments of the invention will be apparent to those skilled in the art. For example, While serial windings T1S1a and T1S1b have been described for producing the scan B+, they could alternatively be in separate, mutually parallel windings, with the voltage of winding T1S1b being greater than that of winding T1S1a.

In the embodiment of FIG. 1, the elements have the following characteristics.

| | |
|---|---|
| Scan B+ | 124/134 volts |
| F101 | 220□F, 22□H, 100□F |
| F102 | 680□F, 27□H, 10□F |
| R117 | 120K ohms |
| R118 | 15K ohms |
| R119 | 3K ohms |
| R120 | 200K ohms |
| R127 | 6K2 ohms |
| R128 | 1M ohms |
| R129 | 10K ohms |
| R130 | 62K ohms |
| R139 | 10 ohms |
| T1P | 36 turns |
| T1S1a | 23 turns |
| T1S1b | 2 turns |
| T1S2 | 3 turns |
| T1f | 2 turns |
| Q104 | Motorola BC847B |
| Q105 | Motorola MPSa06 |
| Q108 | Motorola BC847B |

In the embodiment of FIG. 2, the elements have the following characteristics.

| | |
|---|---|
| C103 | 1.1 nF |
| C104 | 100 nF |
| C105 | 470 pF |
| C107 | 1 nF |
| C108 | 47 nF |
| C109 | 330 pF |
| C110 | 330 pF |
| C111 | 100 nF |
| C112 | 220 pF |
| C120 | 2.2 □F |
| C138 | 180 pF |
| C140 | 470 pF |
| Q101 | Infinion SPP1N60C2 |
| Q102 | Motorlay MPS 8599 |
| Q103 | Motorola MPSA06 |
| CR103 | 16 volts |
| R101 | 51K ohms |
| R103 | 100K ohms |
| R104 | 120K ohms |
| R105 | 330 ohms |
| R106 | 430 ohms |
| R107 | 75 ohms |
| R108 | 510 ohms |
| R109 | 0.22 ohms |
| R110 | 68 ohms |
| R111 | 22K ohms |
| R112 | 10K ohms |
| R114 | 1.1K ohms |
| R115 | 680 ohms |
| R137 | 1K ohms |

What is claimed is:

1. A video display apparatus, comprising:
   a deflection circuit output stage for selectively generating a deflection current in a deflection winding at a first deflection frequency and at a second deflection frequency;
   a power supply for producing via a common power transistor of an output stage a first supply voltage at a first terminal and a second supply voltage at a second terminal;
   a first switch responsive to a control signal that is indicative of the selected deflection frequency for selectively coupling to said deflection circuit output stage, said first supply voltage, when said first deflection frequency is selected, and said second supply voltage, when said second deflection frequency is selected; and
   a power supply regulator responsive to at least one of said first and second supply voltages for regulating said at least one of said first and second supply voltages via a negative feedback path.

2. A video display apparatus according to claim 1, further comprising a second switch responsive to a control signal that is indicative of the selected frequency and coupled in said negative feedback path, said second switch having a first state, when said deflection current is at said first deflection frequency and having a second state, when said deflection current is at said second deflection frequency for providing coarse adjustment.

3. A video display apparatus according to claim 2, further comprising a source of a fine adjustment signal coupled to said negative feedback path for providing fine adjustment.

4. A video display apparatus according to claim 3, wherein a portion of said negative feedback path contains information derived from at least one of said first and second supply voltages, information derived from the state of said second switch and information derived from said fine adjustment signal.

5. A video display apparatus according to claim 2, wherein each of said first and second supply voltages is regulated via said negative feedback path.

6. A video display apparatus according to claim 1, further comprising an output transformer coupled to said power transistor for producing said first supply voltage from a voltage developed in a first transformer winding and said second supply voltage from a voltage developed in a second transformer winding of said transformer and having a third transformer winding for producing a third supply voltage that is coupled to a load circuit, wherein a volts-per-turn ratio in said third transformer winding remains the same at each of said first and second deflection frequencies.

7. A video display apparatus according to claim 1, further comprising an output transformer coupled to said power transistor for producing said first and second supply voltages and having a transformer winding for producing a third supply voltage that is coupled to a load circuit, wherein a volts-per-turn ratio in said transformer winding remains the same at each of said first and second deflection frequencies.

8. A video display apparatus according to claim 1 wherein said power supply regulator is responsive to a feedback signal produced at an output terminal of said first switch for regulating each of said first and second supply voltages.

9. A video display apparatus, comprising:
a deflection circuit output stage for selectively generating a deflection current in a deflection winding at a first deflection frequency and at a second deflection frequency;
a power supply having a power transformer for producing a first supply voltage to energize said deflection circuit output stage, selectively, when said first deflection frequency is selected, and for producing a second supply voltage to energize said deflection circuit output stage, selectively, when said second deflection frequency is selected, said power transformer including a transformer winding for producing a third supply voltage that is coupled to a load circuit; and
a power supply regulator responsive to at least one of said first and second supply voltages for regulating at least one of said first and second supply voltages via a negative feedback path such that a volts-per-turn ratio in said transformer winding remains the same at each of said first and second deflection frequencies.

10. A video display apparatus according to claim 9 wherein said power supply regulator is responsive to said first supply voltage when said first deflection frequency is selected and to said second supply voltage when said second deflection frequency is selected.

11. A deflection arrangement, comprising:
a power supply for producing a first deflection voltage when said deflection arrangement operates at a first deflection frequency and for producing a second deflection voltage when said deflection arrangement operates at a second deflection frequency, different from said first deflection frequency, said power supply also including feedback by way of a feedback path, which feedback tends to control that one of said first and second deflection voltages being generated;
feedback control means coupled to said feedback path, for controlling said feedback to be in a first proportion when said first deflection frequency is selected and in a second proportion, different from said first proportion, when said second deflection frequency is selected, for tending to maintain a set voltage value; and
voltage correction means coupled to said feedback path, for adding a first voltage correction signal to said feedback when said first deflection frequency is selected, and for adding to said feedback a second voltage correction signal, different from said first voltage correction signal, when said second deflection frequency is selected, for correcting the value of said set voltage.

12. A deflection arrangement according to claim 11, wherein said second deflection voltage is greater than said first deflection voltage, and said second deflection frequency is greater than said first deflection frequency.

13. A deflection arrangement according to claim 11, wherein said feedback path includes a voltage divider for reducing the magnitude of said feedback relative to that one of said first and second deflection voltages being generated, and wherein:
said feedback control means comprises a switched impedance coupled to said voltage divider for causing said first proportion to be changed to said second proportion when said second deflection frequency is selected.

14. A deflection arrangement according to claim 11, wherein said voltage correction means comprises a current source for coupling a first current to said feedback path when said first deflection frequency is selected and for coupling a second current, different from said first current, to said feedback path when said second deflection frequency is selected.

15. A power supply, comprising:
a controllable source of varying voltage including a feedback input port;
a transformer including first, second, and third secondary windings, and also including a primary winding coupled to said controllable source, for generating pulsatory voltages in said first, second, and third secondary windings;
rectifying and filtering means coupled to said first secondary winding, for generating a first energizing voltage;
second and third rectifying means coupled to said second and third secondary windings, respectively, for rectifying said pulsatory voltages developed across said second and third secondary windings, respectively;
second filtering means, for smoothing rectified pulsatory voltages for producing a second energizing voltage;
a switch coupled to said second and third rectifying means and to said second filtering means, for, in a first mode of operation, coupling said second rectifying means to said second filtering means, to the exclusion of said third rectifying means, and for, in a second mode of operation, coupling said third rectifying means to said second filtering means; and
feedback means coupled to said second filtering means and to said feedback input port of said source of varying voltage for, in said first mode of operation, coupling to said feedback input port a first proportion of said second energizing voltage, and for, in said second mode of operation, coupling to said feedback input port a second proportion, different from said first proportion, of said second energizing voltage.

16. A power supply according to claim 15, wherein, in said first mode of operation, the rectified pulsatory voltage applied to said second filtering means has a particular value, and, in said second mode of operation, said rectified pulsatory voltage applied to said second filtering means has a second value, greater than said particular value, and said second proportion is less than said first proportion.

17. A power supply according to claim 15, wherein the difference between said first and second proportions is such as to provide the same magnitude of said first energizing voltage in said first and second modes of operation.

18. A power supply according to claim 15, further comprising:
display scan apparatus coupled to said second filtering means for being energized by said second energizing voltage: and
display scan frequency control means coupled to said display scan apparatus, for controlling the scan to be at a first frequency in said first mode of operation and at a second frequency, greater than said first frequency, in said second mode of operation.

19. A power supply, comprising:
a switch mode power supply including a transformer and first, second, and third secondary windings, for producing first, second and third secondary voltages;
first rectifying and filtering means coupled to receive said first secondary voltage for producing a first energizing voltage;

second and third rectifying means coupled to said second and third secondary windings, respectively, for rectifying said second and third secondary voltages for generating second and third rectified secondary voltages;

second filtering means for smoothing rectified secondary voltages to produce a second energizing voltage;

controllable switch means coupled to said second and third rectifying means and to said second filtering means, for, in a first mode of operation, coupling said second rectified secondary voltage from said second rectifying means to said second filtering means, to the exclusion of said third rectified secondary voltage, and for, in a second mode of operation, coupling said third rectified secondary voltage to said second filtering means; and controllable feedback means coupled to said second filtering means and to said switch mode power supply, for coupling a sample of the smoothed voltage produced by said second filtering means to said switch mode power supply for feedback control thereof, said sample being in a first proportion of said smoothed voltage in said first operating mode and in a second proportion, different from said first proportion, in said second operating mode.

20. A power supply according to claim 19, further comprising a display scanner coupled to said second filtering means and equipment ancillary to said display coupled to said first filtering means, for energizing said scanner with different values of voltage in said first and second operating modes, and for energizing said ancillary equipment with the same value of voltage in said first and second operating modes.

* * * * *